United States Patent Office 2,714,785
Patented Aug. 9, 1955

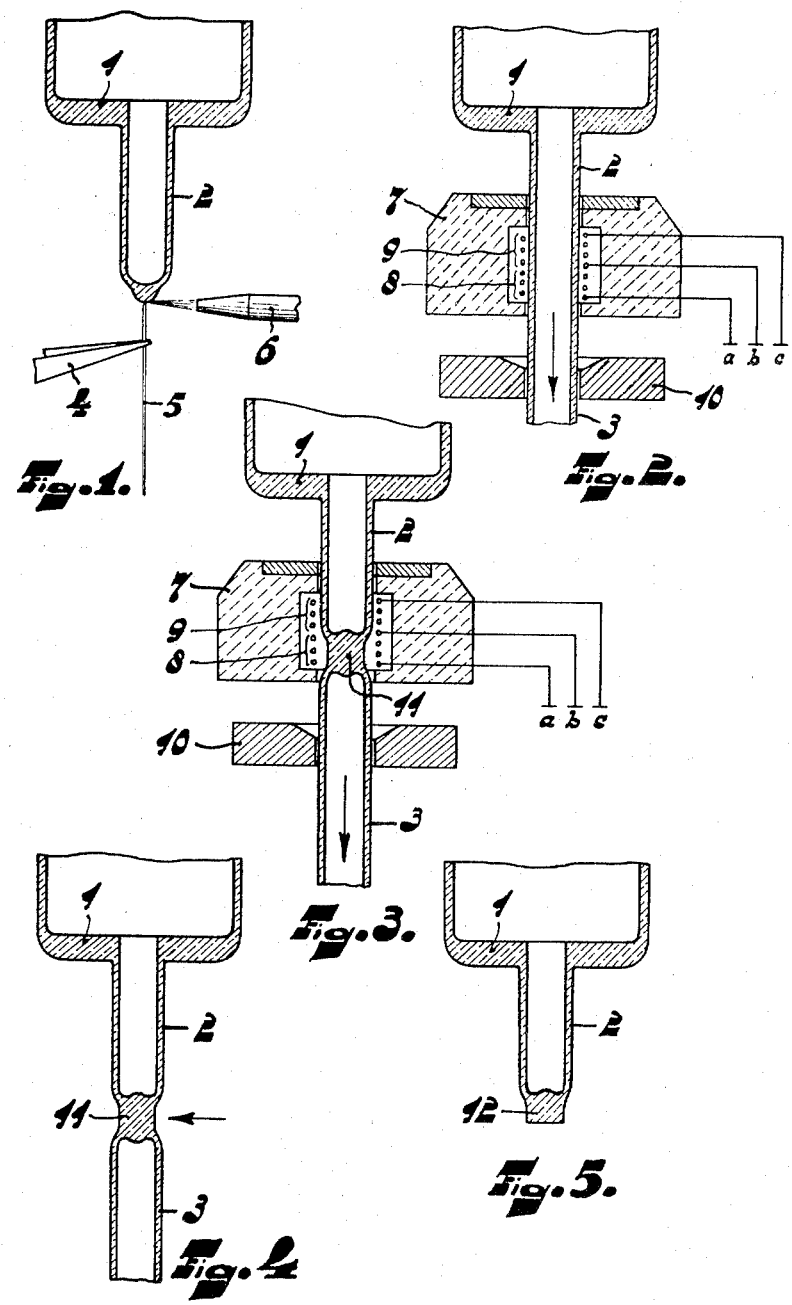

2,714,785

METHOD OF SEALING A VACUUM VESSEL HAVING A THICK-WALLED EXHAUST TUBE

Wilhelmus Antonius Roovers, Eindhoven, Netherlands, assignor to Hartford National Bank and Trust Company, Hartford, Conn., as trustee Application October 29, 1951, Serial No. 253,663

Claims priority, application Netherlands November 21, 1950

5 Claims. (Cl. 49—78)

This invention relates to a method of sealing a vacuum vessel having a thick-walled exhaust tube, more particularly a cathode-ray tube.

Thin-walled exhaust tubes of the type used in wireless receiving tubes can be fused by locally heating them with a pointed flame, and after the tubule is contracted, drawing it down so that it melts through at the heated point and a thickened glass drop is formed. The heating operation may be carried out electrically, as indicated in British specification No. 559,753.

Such exhaust tubes present no appreciable difficulty since the thickened seal of the tubule does not give rise to cracking.

However, it is quite otherwise when sealing off thick-walled exhaust tubes, as may be used with cathode-ray tubes. If in this case the seal is simply formed in the manner indicated above, cracking of the thickened seal substantially always follows subsequently because of the greater wall thickness. For this reason care has been taken that subsequent to the drawing down and melting through of the tubule the excess glass was removed from the hot seal, for example, by using tweezers to pull off glass wires. However, this method is circuitous and hence expensive and a certain skill is required to provide correct sealing-off so that automatic operation is practically impossible.

It is an object of the invention to overcome these disadvantages and to provide a method of sealing thick-walled exhaust tubes. The seal, subsequent to the sealing of the exhaust tube by local heating, is cooled with freedom from stresses without being drawn down and the redundant part of the exhaust tube is then removed. This removal may be effected with advantage by severing or scratching at about half the length of the sealed part.

It has been found that although such an exhaust tube has an appreciable thickness at the end, cracking no longer occurs. The entire process can be effected quickly enough for sealing to be completed at one work station of a rotary machine, while cooling free from stress can be effected at the next station. Since during heating and sealing, the vacuum vessel is connected to the vacuum pump the gas set free from the thick-walled exhaust tube by the heating process does not find its way into the vacuum vessel, the more so because cooling is effected directly upon sealing the exhaust tube, in contradistinction to the known method according to which heating has still to be effected considerable time after the tube is sealed for pulling out the seal, melting it through and removing the redundant glass.

Sealing preferably is effected in a small electrically heated furnace but as an alternative it may be effected by dielectric losses which are produced in the glass by a high-frequency field or by passage of current through the preheated glass itself.

The invention will now be described more fully with reference to the accompanying drawing, in which:

Fig. 1 shows an exhaust tube sealed off in known manner, and

Figs. 2, 3, 4, and 5 show the last four stages of the method of sealing-off an exhaust tube in accordance with the invention.

Referring to the drawing, 1 designates the bottom of a vacuum vessel, in the present instance a cathode-ray tube. Since such a tube has a comparatively high weight the use of a thick-walled exhaust tube 2 is required. According to the known method shown in Fig. 1, subsequent to the exhaust tube being sealed, pulled out and melted through, glass wires 5 are pulled off the seal by using tweezers 4 until this seal no longer has a thickened wall. The flame 6 is not removed until then and the seal is ready. Gas set free subsequent to the sealing of the exhaust tube can no longer be evacuated.

In the method according to the invention the sealing-off time is adjusted to conform with the timing of the work stations of the rotary machine on which the cathode-ray tube 1 is exhausted and sealed. In such a machine the time at each station is frequently 6 minutes. At the point at which the sealing-off operation is effected the exhaust tube 2 is surrounded by an insulating body 7 in which a heating coil 8, 9 is housed. The lower end 3 of the exhaust tube communicates in the usual manner with the vacuum pump by means of a locking device 10. The heating coil is constituted by two components 8 and 9 which are adapted to be heated separately due to the fact that three current leads are provided which at $a$, $b$, and $c$ are connected to a current bus-bar. In the position shown in Fig. 2 coil 8 is heated due to the fact that firstly a voltage of 3.2 volts at 13 amp. (40 watts) is connected for 6 minutes between $a$ and $b$. The seal is thus slowly heated to about 380° C. The machine then travels to the next position in which the seal is completed due to the fact that between $a$ and $b$ the voltage assumes a value of 5 volts at 21 amp. (105 watts). After about 16 to 24 seconds the exhaust tube collapses at 11 and heating is then lessened due to the fact that a voltage is applied between $a$ and $c$ such that the two coils 8 and 9 have jointly supplied to them 28 watts. This results in that the union between the glass wall of the exhaust tube 2 and the sealed part 11, which is located in the middle of the entire coil 8, 9 is cooled evenly and without stresses in contradistinction to the union between 11 and the lower end 3 of the exhaust tube, which union is located at the lower limit of coil 8. After a total of 6 minutes the tube leaves this position and the vacuum vessel can be removed from the machine, the exhaust tube being shaped in the form shown in Fig. 4. Slightly scratching, for example using a file, at the point of the arrow enables the exhaust tube end 3 to be broken off with the result that the seal is completed, the exhaust tube being thus shaped in the form shown in Fig. 5. Since cooling is effected without stresses cracking does not occur in spite of the fact that the tubule has a thickening 12.

Instead of using a double coil 8, 9, alternatively a single coil may be used which during the cooling to avoid stresses, may be raised to such level that the union between the exhaust tube 2 and the seal 11 is at the centre of the coil. However, the mechanism for raising the small furnace 7 is more intricate than the provision of a double heating coil. Heating may alternatively be effected directly by means of gas burners but the use of gas burners is not as advisable in this case since control and adjustment of a given constant temperature is more difficult and cooling without stresses, if necessary, were to be effected by arranging the exhaust tube in a separate annealing furnace.

It is found that the method according to the invention can be carried out quite automatically since the time for sealing the exhaust tube is not critical but may be adjusted between 16 and 24 sec., the time during which the powerful current is passed through the coil being preferably adjusted to 20 sec. Scratching of part 11 may be effected automatically but since the vacuum vessel must, as it is, be removed from the machine it is more simple to effect this scratching by hand with the use of a small file. This does not require any particular skill. As a matter of fact the above-mentioned data depend on the construction and size of machine, exhaust tube, annealing furnace and so forth.

Instead of the coil itself being heated by the passage of current so that the exhaust tube is largely heated by heat radiation it is also possible to pass a high-frequency current through the coil, the exhaust tube being heated by dielectric loss heat produced in the glass itself. As an alternative, after preheating, the exhaust tube may be further heated by means of passage of current through the glass itself.

While the invention has been described in connection with specific applications and embodiments thereof, other modifications will be readily apparent to those skilled in the art without departing from the spirit and scope of the invention, as defined in the appended claims.

What I claim is:

1. A method of sealing a thick-walled glass exhaust tube for a vacuum vessel, comprising the steps of evacuating said vessel through said exhaust tube, locally heating the exhaust tube to fuse a portion of the walls thereof and thereby seal the tube leaving a superfluous portion of the tube remaining attached to the sealed portion, immediately thereafter applying heat to raise the temperature of only the portion of the exhaust tube adjacent the sealed portion on the side thereof adjacent the vessel to prevent stresses from being produced in the sealed portion during cooling, thereafter cooling both said sealed portion and adjacent portion, and mechanically removing the superfluous portion leaving a sealed exhaust tube free of protuberances.

2. A method of sealing a thick-walled glass exhaust tube for a vacuum vessel, comprising the steps of evacuating said vessel through said exhaust tube, locally electrically heating the exhaust tube to fuse a portion of the walls thereof and thereby seal the tube leaving a superfluous portion of the tube remaining attached to the sealed portion, immediately thereafter electrically heating the portion of the exhaust tube adjacent the sealed portion on the side thereof adjacent the vessel to raise only the temperature thereof to prevent stresses from being produced in the sealed portion during cooling, thereafter cooling both said sealed portion and adjacent portion, and mechanically removing the superfluous portion leaving a sealed exhaust tube free of protuberances.

3. A method as claimed in claim 2 in which the initial electric heating of the exhaust tube is effected internally.

4. A method as claimed in claim 2 in which the initial electric heating of the exhaust tube is effected externally.

5. A method of sealing a thick-walled glass exhaust tube for a vacuum vessel, comprising the steps of evacuating said vessel through said exhaust tube, locally preheating the exhaust tube to soften the glass, heating the exhaust tube to a higher temperature to fuse a portion of the walls thereof and thereby seal the tube leaving a superfluous portion of the tube remaining attached to the sealed portion, immediately thereafter cooling the sealed portion and simultaneously heating the portion of the exhaust tube adjacent the sealed portion on the side thereof adjacent the vessel to prevent stresses from being produced in the sealed portion during cooling, thereafter cooling both said sealed portion and adjacent portion, and mechanically removing the superfluous portion leaving a sealed exhaust tube free of protuberances.

References Cited in the file of this patent

UNITED STATES PATENTS

| | | |
|---|---|---|
| 1,572,873 | Allcutt | Feb. 16, 1926 |
| 1,977,671 | De Neumann | Oct. 23, 1934 |
| 2,014,471 | De Neumann | Sept. 17, 1935 |
| 2,055,981 | Magnien | Sept. 29, 1936 |
| 2,248,647 | Strickland | July 8, 1941 |
| 2,262,760 | Gardner et al. | Nov. 18, 1941 |
| 2,278,500 | Smith | Apr. 7, 1942 |

FOREIGN PATENTS

| | | |
|---|---|---|
| 577,738 | Great Britain | May 29, 1946 |